United States Patent
Nijim et al.

(10) Patent No.: US 10,142,668 B1
(45) Date of Patent: Nov. 27, 2018

(54) PAIRING WIRELESS SET-TOP BOX WITH A WIRED SET-TOP BOX

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/207,239

(22) Filed: Mar. 12, 2014

(51) Int. Cl.
| | |
|---|---|
| H04N 7/173 | (2011.01) |
| H04N 21/41 | (2011.01) |
| H04N 21/258 | (2011.01) |
| H04N 21/45 | (2011.01) |

(52) U.S. Cl.
CPC ... H04N 21/4104 (2013.01); H04N 21/25816 (2013.01); H04N 21/25833 (2013.01); H04N 21/25841 (2013.01); H04N 21/4524 (2013.01)

(58) Field of Classification Search
CPC ......... H04N 21/4532; H04N 21/44204; H04N 21/4104; H04N 21/25816; H04N 21/25833; H04N 21/25841; H04N 21/4524
USPC ............ 725/25, 28, 34, 46, 62, 118, 68, 119
See application file for complete search history.

(56) References Cited

U.S. PATENT DOCUMENTS

| | | | |
|---|---|---|---|
| 2006/0046709 A1* | 3/2006 | Krumm | H04N 21/4126 455/422.1 |
| 2008/0155634 A1* | 6/2008 | Khedouri et al. | 725/118 |
| 2010/0043056 A1 | 2/2010 | Ganapathy | |
| 2011/0314153 A1* | 12/2011 | Bathiche | H04L 63/08 709/225 |
| 2012/0202459 A1* | 8/2012 | Martell | H04L 63/083 455/410 |
| 2013/0288604 A1 | 10/2013 | Chang et al. | |
| 2013/0316649 A1 | 11/2013 | Newham | |
| 2014/0113557 A1* | 4/2014 | Jain | H04W 48/04 455/41.2 |
| 2014/0181886 A1 | 6/2014 | Goodman et al. | |
| 2014/0273859 A1 | 9/2014 | Luna et al. | |
| 2014/0364060 A1 | 12/2014 | Srivatsa et al. | |

OTHER PUBLICATIONS

U.S. Appl. No. 14/243,841, filed Apr. 2, 2014 entitled "Pairing and Correlating Mobile Devices to Provide a Personalized User Experience".
U.S. Official Action dated Feb. 10, 2015 in U.S. Appl. No. 14/243,841, 18 pgs.
U.S. Official Action dated Feb. 8, 2016 in U.S. Appl. No. 14/243,841, 11 pgs.

(Continued)

Primary Examiner — Jivka A Rabovianski
(74) Attorney, Agent, or Firm — Merchant & Gould P.C.

(57) ABSTRACT

A system and method for pairing a wireless set-top box with a wired set-top box is provided. The system and method provide a user with the ability to move the wireless set-top box to different locations, within the same authorized subscriber's household or use location, while allowing the service provider to monitor and prohibit unauthorized use of the wireless set-top box from outside of the authorized subscriber's household or use location.

20 Claims, 8 Drawing Sheets

(56) References Cited

OTHER PUBLICATIONS

U.S. Official Action dated Jul. 1, 2015 in U.S. Appl. No. 14/243,841, 27 pgs.
U.S. Official Action dated Aug. 11, 2016 in U.S. Appl. No. 14/243,841, 21 pgs.
U.S. Official Action dated Feb. 28, 2017 in U.S. Appl. No. 14/243,841, 10 pgs.
U.S. Official Action dated Jun. 9, 2017 in U.S. Appl. No. 14/243,841, 22 pgs.
U.S. Official Action dated Sep. 13, 2017 in U.S. Appl. No. 14/243,841, 18 pgs.
U.S. Official Action dated Jan. 22, 2018 in U.S. Appl. No. 14/243,841, 9 pgs.
U.S. Official Action dated Apr. 4, 2018 in U.S. Appl. No. 14/243,841, 3pgs.

* cited by examiner

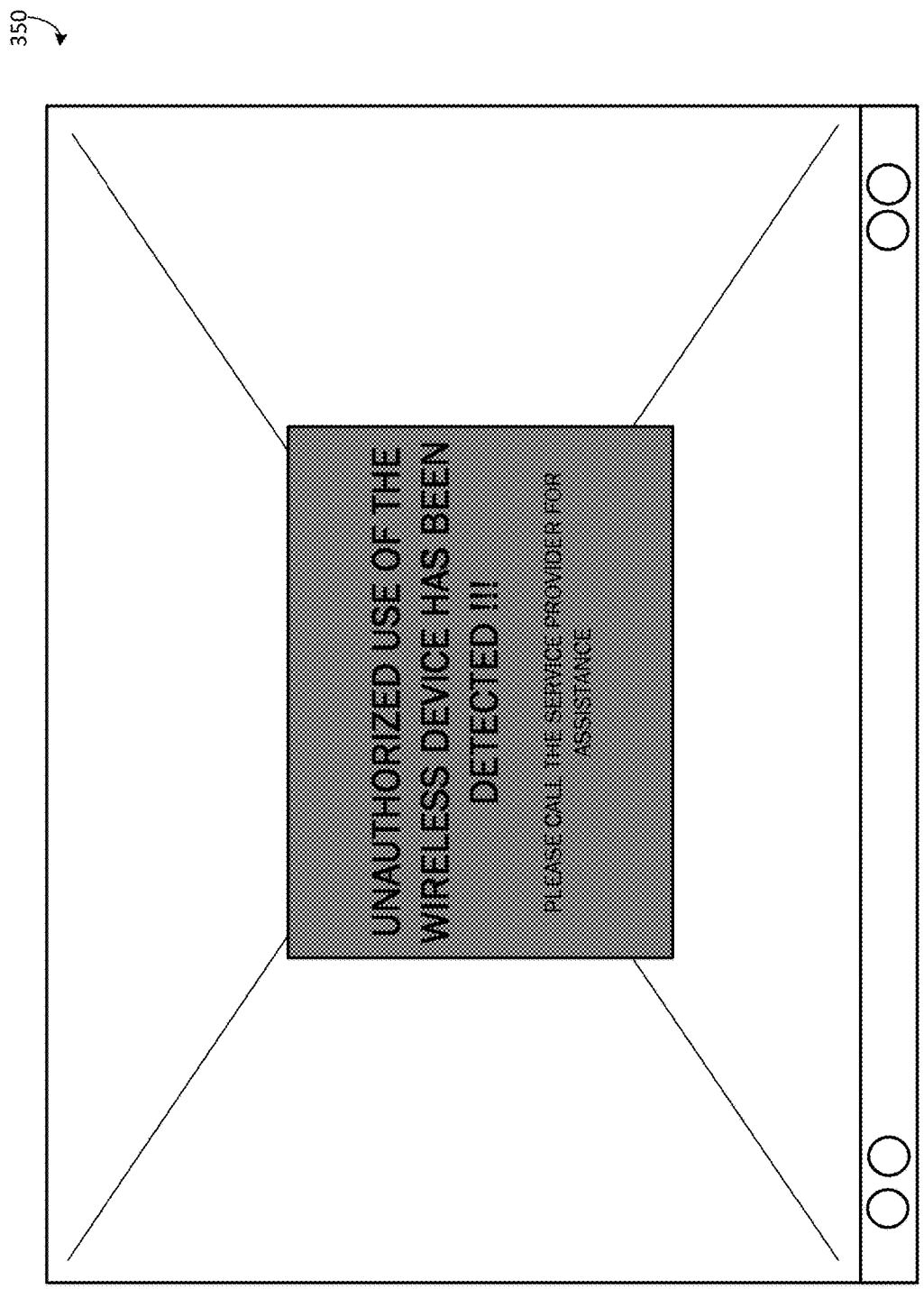

PAIRING WIRELESS SET-TOP BOX WITH A WIRED SET-TOP BOX

BACKGROUND

Video consumers today possess a plurality of devices and television (TV) sets within their households to access video content, such as hundreds of channels of linear content and thousands of pre-recorded "on-demand" movies and television shows, from cable multiple systems operators (MSOs), telephone companies (telcos), and satellite video providers. These devices can be physically connected, such as with wired devices/set-top boxes, or wirelessly connected, such as with wireless devices/set-top boxes. By utilizing both wired and wireless connections, service providers can provide the users with the convenience of accessing the subscribed content through televisions and mobile computing devices located throughout different rooms within their home. However, use of wireless devices/set-top boxes pose various issues relating to security and authentication. For example, the service provider may need to monitor for unauthorized access to subscribed services from outside the authorized subscribed household or use location.

SUMMARY

A system and method for pairing a wireless set-top box with a wired set-top box is provided. One aspect of the system and method for pairing the wireless set-top box with the wired set-top box allows a service provider to monitor the usage of the wireless set-top box to access the subscribed services, whereby unauthorized use of the wireless device outside the subscriber's authorized household or use location may be prohibited.

In one embodiment, the system identifies a first time request to pair a wireless set-top box with a wired set-top box and performs a pairing function. After the initial pairing, the wireless set-top box is operable to access entitled services on devices at other locations throughout the household or subscriber area of use. However, when a request to access subscribed services is received, an analysis is performed to determine whether the location of the wireless set-top box is authorized. For example, the analysis may include various mechanisms based on access points, signal strength, signal availability history, and etc., to determine whether the wireless device/set-top box, requesting to access the service, is located within the subscriber's authorized household or use location. If the wireless set-top box is not located at the subscriber's authorized household or use location, the user-interface notifies the user that the wireless set-top box is unauthorized to access the subscribed services at the location.

Further, the wireless connection to the subscribed services may then be disconnected and the wireless set-top box may be un-paired from the wired set-top box. For the wireless set-top box to be used again, the wireless set-top box may perform another pairing procedure to pair the wireless set-top box with the wired set-top box. The number of times the pairing is performed, such as when the wireless set-top box was disconnected due to unauthorized, may be recorded for further monitoring purposes.

Accordingly, the user is provided with the ability and ease to move the wireless set-top box to different locations within the same authorized subscriber's household or use location, while allowing the service provider to monitor and prohibit unauthorized use of the wireless set-top box from outside of the authorized subscriber's household or use location.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF DRAWINGS

Referring now to the drawings in which like reference numbers represent corresponding parts throughout:

FIG. 3B is an illustration of a user-interface, for notifying the unauthorized use of the wireless set-top box, according to an embodiment;

DETAILED DESCRIPTION

Figure 1:
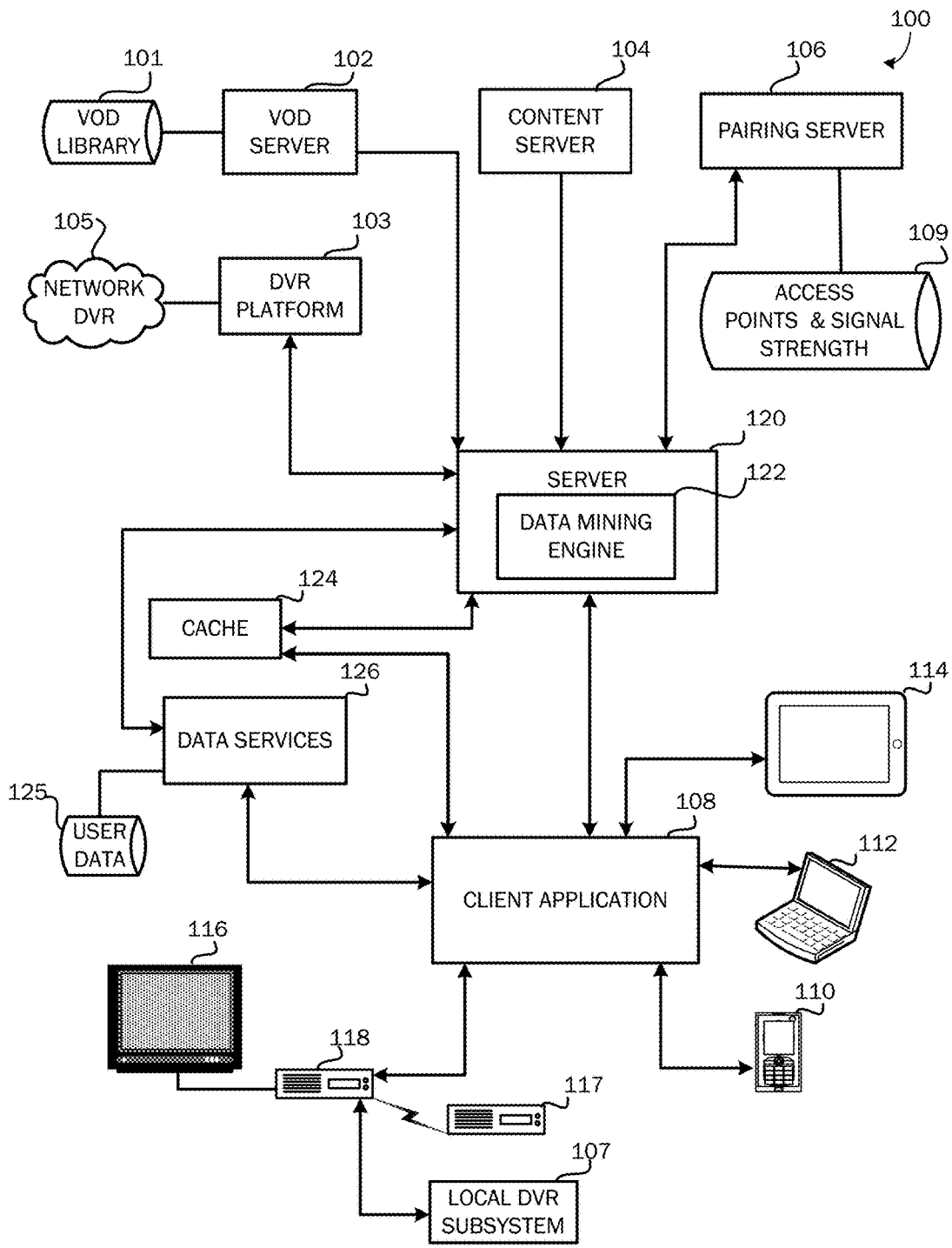
FIG. 1 is a block diagram illustrating a system for pairing a wireless set-top box with a wired set-top box.

As briefly described above, embodiments of the present invention provide for pairing a wireless set-top box with a wired set-top box. In one embodiment, the system identifies a first time request to pair a wireless set-top box with a wired set-top box and performs a pairing function. The pairing function may be performed via a plurality of mechanisms, such as a Network on a chip (NOC) which is a communication subsystem on an integrated circuit, or a Wi-Fi protected setup (WPS) pairing. Further, the pairing function may be secured by password so that only an authorized user of the subscribed household or use account may be able to perform the pairing. In one embodiment, the pairing function enables the wireless set-top box to be associated with the wired set-top box only at the subscriber's authorized household or use location to provide services entitled for that specific household or use account.

After the initial pairing, the wireless set-top box is authorized to be moved within the household or use location to access the same entitled services, which may be accessed via the wired set-top box on devices in other rooms of the same household or use location. When a request to access subscribed services is received, an analysis is performed to determine whether the location of the wireless set-top box is authorized. For example, the analysis may include various mechanisms based on access points, signal strength, signal availability history and etc., to determine whether the wireless device/set-top box, requesting to access the service, is located within the subscriber's authorized household or use location. If the wireless set-top box is not located at the subscriber's authorized household or use location, a user-interface on to the display device notifies the user that the wireless set-top box is unauthorized to access the subscribed services at the location. The user-interface may also notify the user that the wireless set-top box, which is requesting to access the entitled services, is outside the boundaries of the subscriber's authorized household or use location and if the user may wish to access services at the unauthorized location, he/she may need to contact their service provider. The wireless connection to the subscribed services may then be disconnected and the wireless set-top box may be un-paired from the wired set-top box. For the wireless set-top box to be used again, the wireless set-top box may perform another pairing procedure to pair the wireless set-top box with the wired set-top box. The number of times the pairing is performed, such as when the wireless set-top box was disconnected due to unauthorized access, may be recorded for further monitoring purposes.

Accordingly, the user is provided with the ability and ease to move the wireless set-top box to different locations, within the same authorized subscriber's household or use location, while allowing the service provider to monitor and prohibit unauthorized use of the wireless set-top box from outside of the authorized subscriber's household or use location.

FIG. 1 is a block diagram of a system 100 for providing pairing of a wireless set-top box with a wired set-top box, according to an embodiment. Components of the system 100 may operate as a distributed system where each component is accessed via a suitable network, or the components may operate together as an integrated system. As illustrated, content server 104, network DVR platform 103, local DVR subsystem 107, VOD server 102 and pairing server 106 may be provided.

Content server 104 may include video content data and metadata available via a service provider, such as cable television (CATV) services system (as illustrated and described below with reference to FIG. 7), satellite television provider, or a provider on the Internet such as YouTube®, Hulu®, etc. The data and metadata may include information such as video content title, storyline, cast, genre, rating, release date, images, etc.

Pairing server 106 may comprise data and metadata related to the devices authorized to provide entitled services such as the wired/wireless STBs, and devices authorized to access the entitled services for the household or use subscription account with a wired connection or wirelessly, etc. According to embodiments, the pairing server 106 may also have access to the data and metadata about the various access points that may be in and around the subscriber's authorized household or use location, signal strength data within the various areas within the subscriber's authorized household or use location, and the signal strength history data via an access point and signal strength database 109.

For example, when a user initially pairs a wireless set-top box with the wired set-top box, the system may identify the various access points in the area and record the various signal strengths. The access points in and around the area may comprise, the user's Wi-Fi connection within the authorized household or use location, the neighbor's Wi-Fi connections that may be password protected, the Wi-Fi hotspots that may be available in the vicinity etc. Also while the user continues to use the wireless set-top box, the system records and saves the nearby access points from where the user may be initially using the wireless set-top box at the authorized household or use location. For instance, one room of the subscriber's authorized household or use location may have different signal strength than another room in that same household or use location depending on the vicinity of the wireless set-top box to the router.

Network DVR platform 103 may comprise various DVR recordings or pointers to various DVR recordings recorded on a network DVR 105 that may be available for viewing. DVR recordings may also be stored locally via a local DVR subsystem 107 connected to a set-top box 118 in communication with a television set 116.

VOD server 102 may provide access to various VOD content items, stored either within the VOD library 101 maintained by the content provider, or the VOD content that may be available via the Internet. VOD server 102, network DVR platform 103, pairing server 106 and content server 104 may be provided to a server 120 where a data mining engine 122 may be operable to analyze the data and metadata from the pairing server 106 in relation to the wireless set-top box authorized to access services at the subscriber's authorized household or use for providing initial wireless set-top box pairing with the wired set-top box and to eventually analyze every subsequent request and ensure that the requesting wireless set-top box is within the subscriber's authorized household or use location.

The associated channel/guide/content/contacts data may be cached. The cache 124 is illustrated in FIG. 1 as a remote element, but may be integrated with the server 120 or the client application 108. As new information becomes available, the associated channel/guide/content/contacts data may be updated in the cache 124.

The associated channel/guide/content data may be stored in a cache 124 located on the server 120, on the application 108, or may be located remotely and accessed via a network. The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data.

As illustrated in FIG. 1, various endpoint devices may be able to access services from the paired wireless set-top box to provide the entitled services at other areas of the subscriber's authorized household or use location without the inconvenience of disconnecting and connecting the wires when moving a wired set-top box. For example, endpoint devices may include, but are not limited to, a mobile communication device 110, such as a mobile phone, a computing device 112, such as a desktop computer, a laptop computer, etc., a wireless computing device, such as a tablet computing device 114, a television set 116, such as an Internet-connected television or a television connected to a network-connected device, such as a wired set-top box (STB) 118 or a wireless set-top box 117. An endpoint device 110, 112, 114, 116 is utilized to access a client application 108. According to embodiments, wireless set-top box 117 may be able to connect wirelessly to one or more wired set-top boxes within a same household or use account.

Figure 3A:
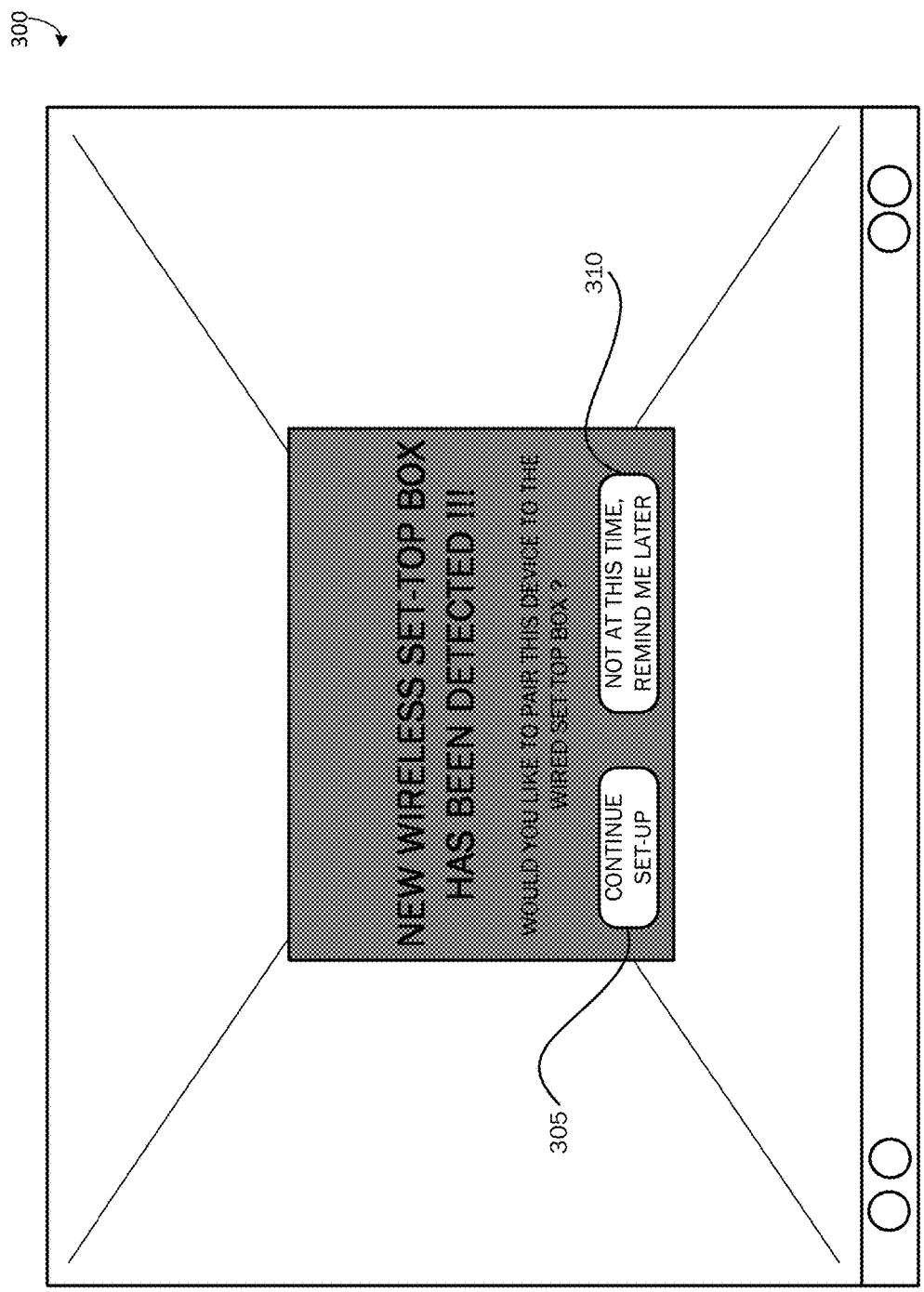
FIG. 3A is an illustration of a user-interface, for notifying the detection of a new wireless device and providing options to begin the pairing procedure or to perform pairing at a later time, according to an embodiment.

The client application 108 may be operable to provide a user-interface 300 as illustrated in FIG. 3A when a new wireless set-top box is detected, that may provide the user with an option to either initiate the first time pairing function or an option to provide pairing at a later time. For example, a designated button or other selectable control on a remote control or other suitable hard or soft key selection device may be used to initiate the pairing function. In another example, a secondary screen companion device such as a tablet or other hand held computing device with an associated content provision application may also be used to accept input for performing the paring function. Other suitable means for performing the paring function may include touch command, voice command, gesture command and combinations of various functionality interface methods and systems.

The client application 108 is operable to receive information regarding the wireless set-top box to be paired, and provide it to the server 120 wherein the data mining engine 122 may be operable to analyze the information received from the client application 108 in relation with data regarding devices capable of pairing from the pairing server 106 etc. Once the initial pairing procedure is performed, the client application 108 may further be operable to receive a request to access the entitled services from the paired wireless set-top box and provide it to the server 120, wherein the data mining engine 122 may further be operable to analyze the request received from the client application 108 in relation with data regarding paired devices from the pairing server 106 etc. and identify if the requesting device resides within the boundaries of the subscriber's authorized household or use location. Once an unauthorized access is identified, the client application 108 is operable to notifying the wireless device/STB, via a user-interface as illustrated in FIG. 3B, that the request to view services is unauthorized.

Figure 2:
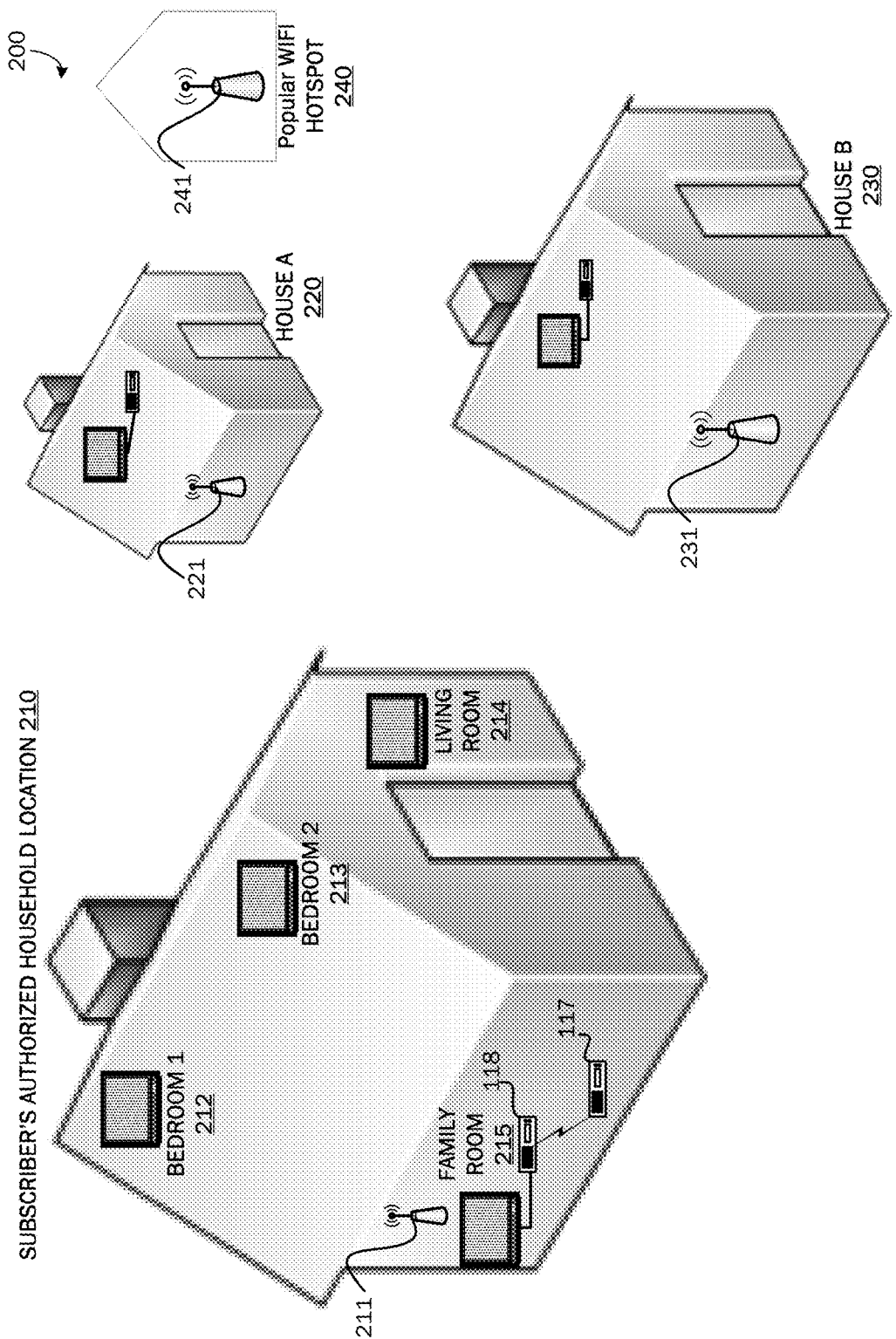
FIG. 2 is a block diagram illustrating an example of an embodiment of a system for pairing a wireless set-top box with a wired set-top box.

FIG. 2 is a block diagram 200 illustrating an example environment of an embodiment of a system for pairing a wireless set-top box with a wired set-top box. As illustrated in FIG. 2, subscriber's authorized household or use location 210 may be the location where the account may be subscribed. The wired set-top box 118 may be installed in the family room 215. The wireless set-top box 117 may be paired with the wired set-top box 118 for the wireless set-top box 117 to be moved around the subscriber's authorized household or use location 210 to access the entitled services in the various areas within the subscriber's authorized household or use location 210, such as bedroom 1 212, bedroom 2 213, living room 214 etc. A Wi-Fi Internet connection may be available within the subscriber's authorized household or use location 210 via an access point 211. The neighboring access points in the vicinity may include the Wi-Fi connections 221, 231 of the neighbor's house A 220 and the neighbor's house B 230, respectively. Access point may also include the Wi-Fi hotspot connection 241 available at a nearby popular Wi-Fi Hotspot location 240.

According to embodiments, the wireless set-top box is authorized and may provide access to the entitled services within the subscriber's authorized household or use location 210. But if for example the wireless set-top box 117 is moved outside of the subscriber's authorized household or use location 210 to house A 220 or house B 230, and an attempt to access the entitled services of the subscriber's authorized household or use location 210 is made, then the system determines whether the wireless set-top box has been moved outside of the subscriber's authorized household or use location 210 and determines that the entitled services may not be accessed. Some embodiments may further unpair the wired set-top box 118 and the wireless set-top box 117 because of attempts to access the entitled services from outside the subscriber's authorized household or use location 210. According to an embodiment, the system may also record the number of unauthorized access attempts for further monitoring.

FIG. 3A is an illustration of one embodiment of a user-interface 300 for notifying the detection of a new wireless device and providing options to begin the pairing procedure or to perform pairing at a later time. The option 305 may be selected to begin the pairing of the wired set-top box 118 with the wireless set-top box 117. An option 310 may also be provided to enable the user to perform the pairing function at a later time.

FIG. 3B is an illustration of one embodiment of a user-interface 350 for notifying the user that the system has identified unauthorized use of the wireless set-top box. Further, in the illustrated embodiment, the user-interface includes a message for the user to call the service provider for assistance. As should be appreciated the user interfaces, illustrated in FIGS. 3A and 3B, are for purposes of illustration only and are not limiting of other notifications that may be provided. In addition, such user interfaces may be provided, but are not required, as authorized device pairing may occur automatically and as unauthorized pairing may be prevented, both without notification.

Figure 4:
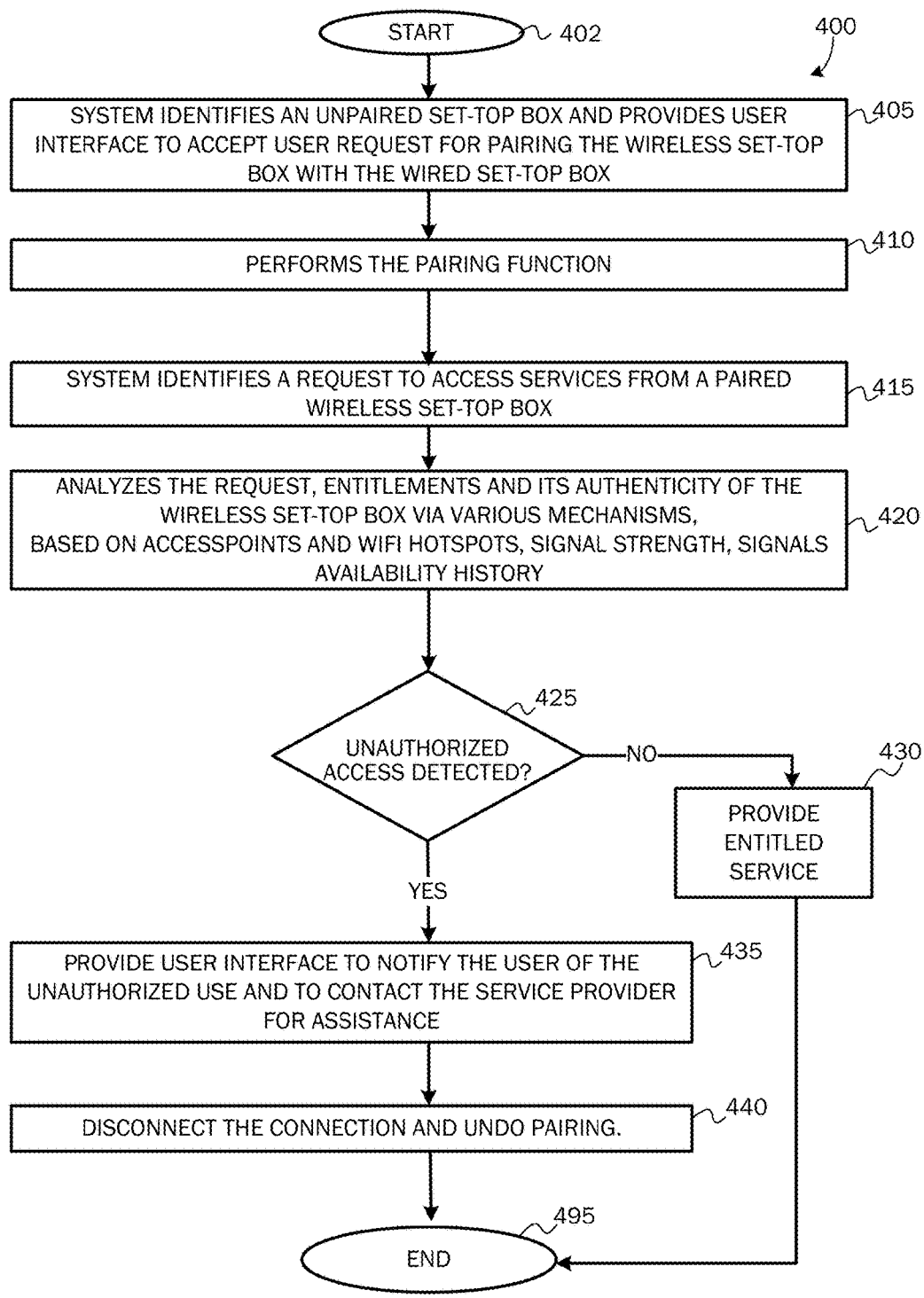
FIG. 4 is a flow chart of a method for pairing a wireless set-top box with a wired set-top box, according to an embodiment.

FIG. 4 is a flow chart of a method 400 for pairing a wireless set-top box with a wired set-top box, according to an embodiment. The method 400 starts at OPERATION 402 and proceeds to OPERATION 405 where the system may identify an unpaired wireless set-top box for the first time. A user-interface as illustrated in FIG. 3A may be presented on the viewing device notifying that a new wireless set-top box has been detected and may be paired with the wired set-top box of the authorized household or use subscription account. After receiving a selective indication from the user, the method 400 proceeds to OPERATION 410, where it may perform the pairing function. As mentioned earlier, the pairing function may be performed via a plurality of mechanisms such as a Network on a chip (NOC) which is a communication subsystem on an integrated circuit or a Wi-Fi protected setup (WPS) pairing. The pairing function may be secured by password such that only an authorized user of the subscribed account may be able to perform the same.

Once the pairing function is performed, the method 400 proceeds to OPERATION 415, where the system may identify a request to access the entitled services from a paired wireless set-top box.

The method 400 proceeds to OPERATION 420, wherein an analysis may be performed to check if the requesting wireless set-top box is the authorized paired wireless set-top box and that if the location of the wireless set-top box is within the boundaries of the authorized household or use subscription account. According to embodiments, the above analysis may be performed based on access points, signal strength, signal availability history, etc.

For example, when the initial pairing is performed at OPERATION 410, various access points, in and around the authorized household or use location, are identified and saved. As described earlier, the various access points, in and around the area may comprise, the user's Wi-Fi connection within the authorized household or use location, the neighbor's Wi-Fi connections that may be password protected, the Wi-Fi hotspots that be available in the vicinity, etc. The relative distance of these access points and their radio frequency (RF), may also be recorded and saved. Also while the user continues to use the wireless set-top box, the system may record and save the nearby access points from where the user may be initially using the wireless set-top box inside the authorized household or use location. For instance, one room of the subscriber's authorized household or use location may have different signal strength than another room in that same household or use location depending on the vicinity of the wireless set-top box to the router.

As a result of the analysis performed at OPERATION 420, the method 400 proceeds to OPERATION 425, where a check may be performed whether unauthorized access is detected per the analysis performed in OPERATION 420. In one example, when the wireless STB makes the pairing with the wired STB, the method is able determine when the wireless STB is out of range of the authorized household or use location because the signal strength would change as compared the historical signal strength of the wireless STB at the authorized household or use location.

If unauthorized access is not detected, then the method 400 may proceed to OPERATION 430, wherein the entitled services may be provided on the display device in communication with the requesting wireless set-top box and the method 400 may end at OPERATION 495.

Alternatively, if unauthorized access is detected, then the method 400 may proceed to OPERATION 435, where a user-interface 300, as illustrated in FIG. 3B, may be presented on the display device, notifying the user of the unauthorized use and informing the user that the wireless set-top box, which is requesting to access the entitled services, is outside the boundaries of the subscriber's authorized household or use location and if the user may wish to access entitled services, he/she may need to contact their service provider.

The method 400 may then proceed to OPERATION 440, where the wireless connection may be disconnected and pairing of the wireless set-top box to the wired set-top box at the subscriber's authorized household or use location may be undone. For the wireless set-top box to be used again, even within the subscriber's authorized household or use location, the system may require the pairing procedure to be performed again. As can be appreciated, the number of times the pairing is performed due to unauthorized disconnection may be recorded for further monitoring purposes. The method ends at OPERATION 495.

Figure 5:
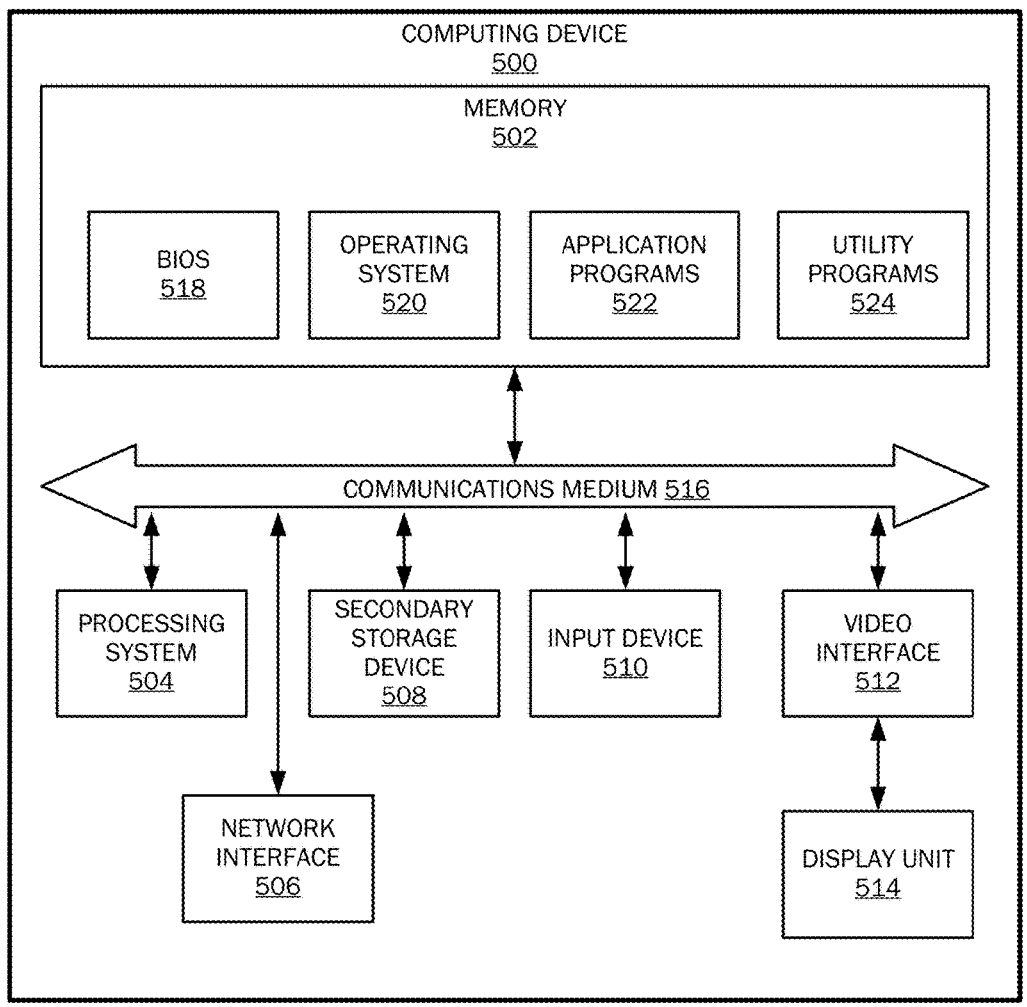
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the system 100 may be implemented using one or more computing devices like the computing device 500. It should be appreciated that in other embodiments, one or a combination of the components of the system 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, and a display unit 514. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. Memory 502 thus may store the computer-executable instructions that, when executed by processing system 504, provide for pairing of a wireless set-top box with a wired set-top box as described above with reference to FIGS. 1-4.

In various embodiments, the memory 502 is implemented in various ways. For example, the memory 502 can be implemented as various types of computer-readable storage media. Example types of computer-readable storage media include solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other articles of manufacture that store data.

According to embodiments, the term computer-readable media includes communication media. Communication media includes information delivery media. Computer-executable instructions, data structures, program modules may be embodied on a communications medium. For example, communication media can include wired media, such as a wired network or direct-wired connection, and wireless media, such as acoustic, radio frequency (RF), infrared, and other wireless media.

The term computer-readable storage medium refers only to devices and articles of manufacture that store data and/or computer-executable instructions readable by a computing device. Computer-readable storage medium do not include communications media. The term computer-readable storage media encompasses volatile and nonvolatile and removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figure 6:
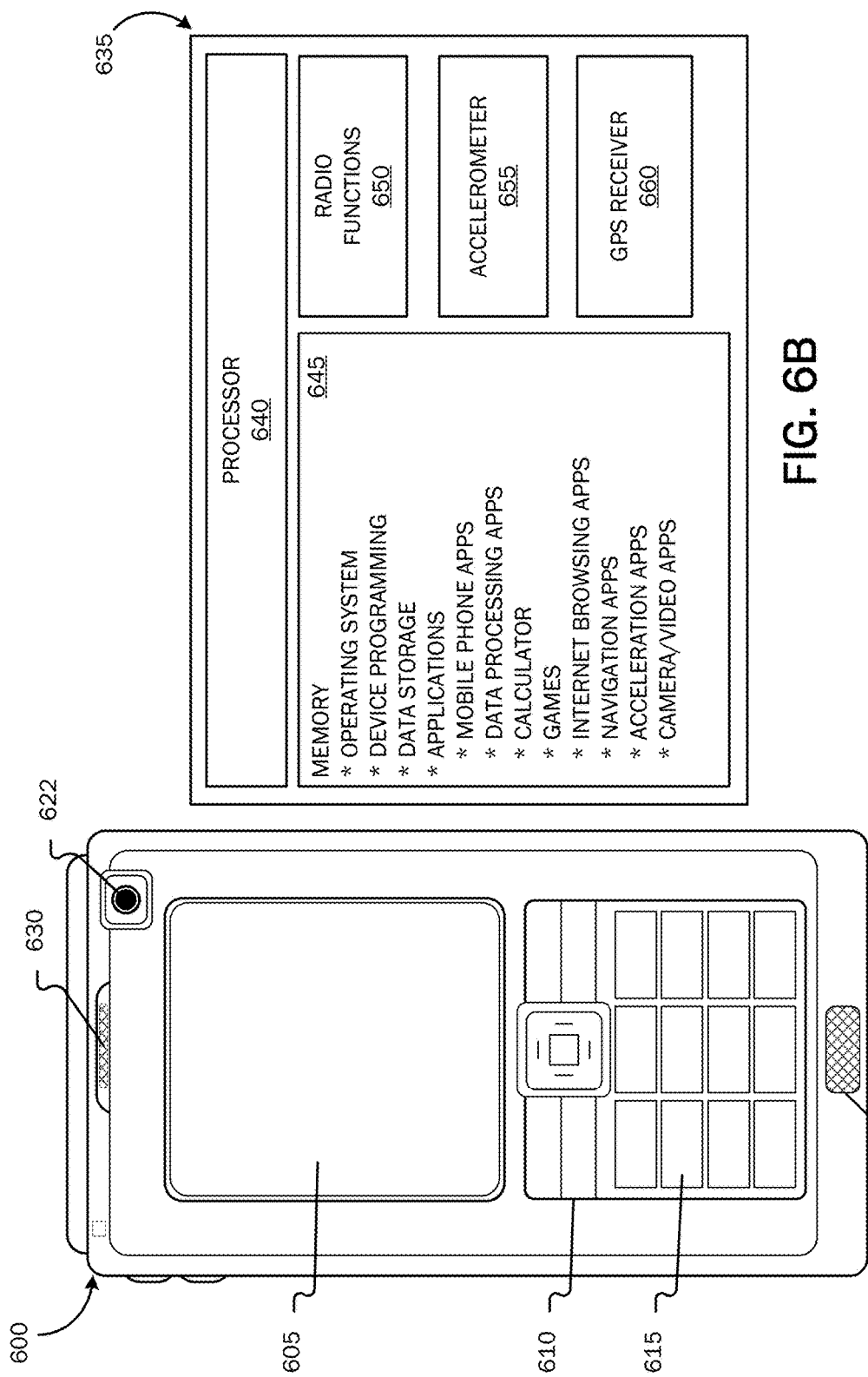
FIGS. 6A-6B illustrate a suitable mobile computing environment with which embodiments may be practiced.

FIGS. 6A-6B illustrate a suitable mobile computing environment, for example, a mobile computing device 600, a mobile phone/smartphone, a tablet device, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the mobile computing device 600 may be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 622 functionality associated with the mobile computing device, or any other suitable input means. Data may be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, application software to analyze wireless set-top box pairing and quality of service user-interface may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 may be utilized to communicate with a wireless or Wi-Fi based positioning system to determine a location of a device 600.

Figure 7:
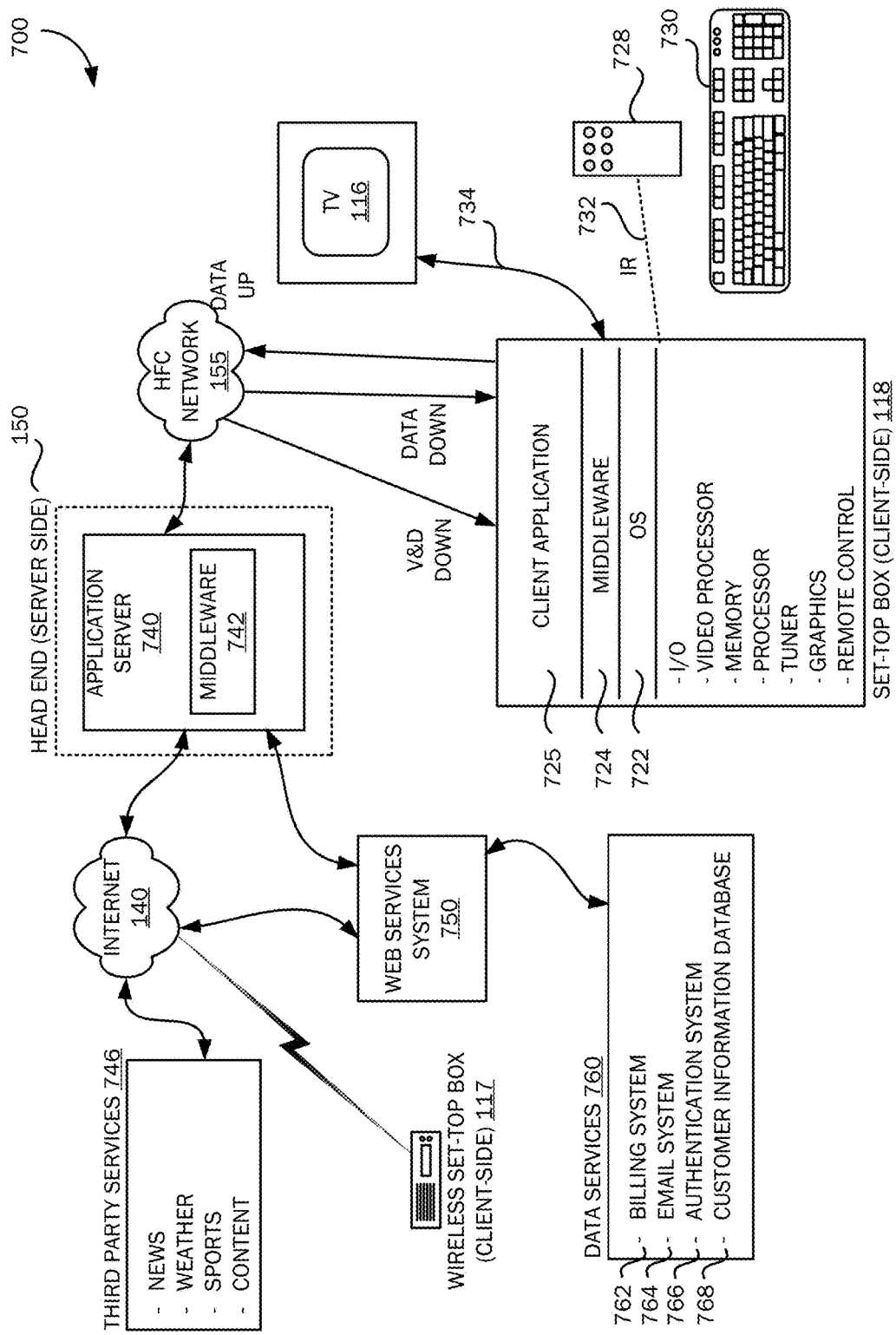
FIG. 7 is a block diagram illustrating a cable television services system architecture providing an operating environment according to an embodiment.

FIG. 7 is a block diagram illustrating a cable television services system 700 (hereafter referred to as "CATV") architecture providing an operating environment according to an embodiment. As can be appreciated, CATV architecture is but one of various types of systems that may be utilized to provide substituted VOD content. Referring now to FIG. 7, digital and analog video programming, information content and interactive television services are provided via a hybrid fiber coax (HFC) network 155 to a television set 116 for consumption by a cable television/services system customer. As is known to those skilled in the art, HFC networks 155 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 155 allows for efficient bidirectional data flow between the client-side set-top box 118/117 and a server-side application server 740.

The CATV system 700 is in the form of a distributed client-server computing system for providing video and data flow across the HFC network 155 between server-side services providers (e.g., cable television/services providers) via a server-side head end 150 and a client-side customer via a client-side set-top box (STB) 118 in communication with a customer receiving device, such as the television set 116. As is understood by those skilled in the art, modern CATV systems 700 may provide a variety of services across the HFC network 155 including traditional digital and analog video programming, telephone services, high speed Internet access, video-on-demand, and information services.

On the client side of the CATV system 700, digital and analog video programming and digital and analog data are provided to the customer television set 116 via the set-top box (STB) 118/117. Interactive television services that allow a customer to input data to the CATV system 700 likewise are provided by the STB 118. As illustrated in FIG. 7, the STB 118/117 is a multipurpose computing device having a computer processor, memory, and an input/output mechanism. The input/output mechanism receives input from server-side processes via the HFC network 155 and from customers via input devices such as the remote control device 728, keyboard 730, or other computing device, such as a tablet/slate computer 114, mobile computing device 600, etc. The remote control device 728 and the keyboard 730 may communicate with the STB 118 via a suitable communication transport such as the infrared connection 732. The STB 118 also includes a video processor for processing and providing digital and analog video signaling to the television set 116 via a cable communication transport 734. A multi-channel tuner is provided for processing video and data to and from the STB 118 and the server-side head end system 150, described below.

The STB 118 also includes an operating system 722 for directing the functions of the STB 118 in conjunction with a variety of client applications 725. For example, if a client application 725 requires a news flash from a third-party news source to be displayed on the television set 116, the operating system 722 may cause the graphics functionality and video processor of the STB 118, for example, to output the news flash to the television set 116 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server 740 and the client-side STB 118. The middleware layer 742 of the server-side application server 740 and the middleware layer 724 of the client-side STB 118 may format data passed between the client side and server side according to the Extensible Markup Language (XML).

According to one embodiment, the set-top box 118 passes digital and analog video and data signaling to the television set 116 via a one-way communication transport 734. According to other embodiments, two-way communication transports may be utilized, for example, via high definition multimedia (HDMI) ports. The STB 118 may receive video and data from the server side of the CATV system 700 via the HFC network 155 through a video/data downlink and data via a data downlink. The STB 118 may transmit data from the client side of the CATV system 700 to the server side of the CATV system 700 via the HFC network 155 via one data uplink. The video/data downlink is an "in band" downlink that allows for digital and analog video and data signaling from the server side of the CATV system 700 through the HFC network 155 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 155 and the set-top box 118 comprise "out of band" datalinks. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 740 is typically passed through the "out of band" data links. Alternatively, an "in band" data carousel may be positioned in an "in band" channel into which a data feed may be processed from the server-side application server 740 through the HFC network 155 to the client-side STB 118. Operation of data transport between components of the CATV system 700, described with reference to FIG. 7, is well known to those skilled in the art.

Referring still to FIG. 7, the head end 150 of the CATV system 700 is positioned on the server side of the CATV system and includes hardware and software systems responsible for originating and managing content for distributing through the HFC network 155 to client-side STBs 118 for presentation to customers via television sets 116. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side set-top box 118 via the HFC network 155. As described above with reference to the set-top box 118, the application server 740 includes a middleware layer 742 for processing and preparing data from the head end of the CATV system 700 for receipt and use by the client-side set-top box 118. For example, the application server 740 via the middleware layer 742 may obtain data from third-party services 746 via the Internet 140 for transmitting to a customer through the HFC network 155 and the set-top box 118. For example, content metadata of a third-party content provider service may be downloaded by the application server 740 via the Internet 140. When the application server 740 receives the downloaded content metadata, the middleware layer 742 may be utilized to format the content metadata for receipt and use by the set-top box 118. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 118 through the HFC network 155 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 140 for provision to customers via the HFC network 155 and the set-top box 118.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for pairing a wireless set-top box with a wired set-top box, the method comprising:
   receiving a request to pair the wireless set-top box with the wired set-top box;
   pairing the wireless set-top box with the wired set-top box and, as a result of the pairing, identifying a subscriber's authorized use location for the wired set-top box based on one or more access points being available to the wireless set-top box at the time of the pairing for accessing subscribed services via the one or more access points, wherein the one or more access points is other than the wired set-top box;
   while the wireless set-top box and the wired set-top box are paired, monitoring for requests received from the wireless set-top box via another access point outside the authorized use location, wherein the other access point was not available to the wireless set-top box at the time of the pairing for accessing subscribed services; and in response to receiving a request for service at the wired set-top box from the wireless set-top box to access subscribed services via the other access point outside the subscriber's authorized use location, determining the wireless set-top box is not within the subscriber's authorized use location; and in response to determining the wireless set-top box is not within the subscriber's authorized user location, unpairing the wireless set-top box from the wired set-top box, prohibiting access to the subscribed services by the wireless set-top box via the other access point, and presenting a user-interface including a message that notifies the subscriber of unauthorized use due to the wireless set-top box being outside the boundaries of the subscriber's authorized use location.

2. The method of claim 1, further comprising providing the subscribed services when the wireless set-top box is within the subscriber's authorized use location.

3. The method of claim 1, wherein determining if the wireless set-top box is within the subscriber's authorized use location is based on one or more of:
   access points data; and
   signal strength data.

4. The method of claim 3, wherein the access points data comprises:
   wireless connections inside the subscriber's authorized use location;
   neighboring wireless connections around the subscriber's authorized use location; and
   wireless hotspots in vicinity of the subscriber's authorized use location.

5. The method of claim 3, wherein the signal strength data comprises signal strengths from different areas within the subscriber's authorized use location.

6. The method of claim 5, wherein the signal strengths from different areas within the subscriber's authorized use location is compared to historical data on signal strengths available around the subscriber's authorized use location.

7. The method of claim 1, further comprises recording a number of times the pairing is performed.

8. A system for pairing a wireless set-top box with a wired set-top box, the system comprising:
   a memory; and
   a processing unit coupled to the memory, wherein the one or more processing units are operable to:
   receive a request to pair the wireless set-top box with the wired set-top box;
   pair the wireless set-top box with the wired set-top box and, as a result of the pair, identify a subscriber's authorized use location for the wired set-top box based on one or more access points being available to the wireless set-top box at the time of the pairing for accessing subscribed services via the one or more access points, wherein the one or more access points is other than the wired set-top box;
   while the wireless set-top box and the wired set-top box are paired, monitoring for requests for service received from the wireless set-top box via another access point outside the authorized use location, wherein the other access point was not available to the wireless set-top box at the time of the pairing for accessing subscribed services; and
   in response to a request for service at the wired set-top box from the wireless set-top box to access subscribed services via the other access point outside the subscriber's authorized use location when the wireless set-top box is not within the subscriber's authorized use location, unpair the wireless set-top box from the wired set-top box, prohibit access to the subscribed services by the wireless set-top box, and present a user-interface including a message that notifies the subscriber of unauthorized use due to the wireless set-top box being outside the boundaries of the subscriber's authorized use location.

9. The system of claim 8, further comprising providing the subscribed services when the wireless set-top box is within the subscriber's authorized use location.

10. The system of claim 8, wherein determining if the wireless set-top box is within the subscriber's authorized use location is based on one or more of:
    access points data; and
    signal strength data.

11. The system of claim 10, wherein the access points data comprises:
    wireless connections inside the subscriber's authorized use location;
    neighboring wireless connections around the subscriber's authorized use location; and
    wireless hotspots in vicinity of the subscriber's authorized use location.

12. The system of claim 10, wherein the signal strength data comprises signal strengths of access points from different areas within the subscriber's authorized use location.

13. The system of claim 12, wherein the signal strengths of access points from different areas within the subscriber's authorized use location is compared to historical data on signal strengths available around the subscriber's authorized use location.

14. The system of claim 8, further comprises recording a number of times the pairing is performed.

15. A computer readable storage device, not including a propagated signal, containing computer executable instructions which when executed by a computer perform a method for pairing a wireless set-top box with a wired set-top box, comprising:
    receiving a request to pair the wireless set-top box with the wired set-top box;
    pairing the wireless set-top box with the wired set-top box and, as a result of the pairing, identifying a subscriber's authorized use location for the wired set-top box based on one or more access points being available to the wireless set-top box at the time of the pairing for accessing subscribed services via the one or more access points, wherein the one or more access points is other than the wired set-top box;
    while the wireless set-top box and the wired set-top box are paired, monitoring for requests for service received from the wireless set-top box via another access point outside the authorized use location, wherein the other access point was not available to the wireless set-top box at the time of the pairing for accessing subscribed services; and
    in response to receiving a request for service at the wired set-top box from the wireless set-top box to access subscribed services via the other access point outside the subscriber's authorized use location when the wireless set-top box is not within the subscriber's authorized use location, unpairing the wireless set-top box from the wired set-top box, prohibiting access to the subscribed services by the wireless set-top box, and presenting a user-interface including a message that notifies the subscriber of unauthorized use due to the wireless set-top box being outside the boundaries of the subscriber's authorized use location.

16. The computer readable storage device of claim 15, further comprising providing the subscribed services when the wireless set-top box is within the subscriber's authorized use location.

17. The computer readable storage device of claim 15, wherein determining if the wireless set-top box is within the subscriber's authorized use location is based on one or more of:
   access points data; and
   signal strength data.

18. The computer readable storage device of claim 17, wherein the access points data comprises:
   wireless connections inside the subscriber's authorized use location;
   neighboring wireless connections around the subscriber's authorized use location; and
   wireless hotspots in vicinity of the subscriber's authorized use location.

19. The computer readable storage device of claim 17, wherein the signal strength data comprises signal strengths of access points from different areas within the subscriber's authorized use location.

20. The computer readable storage device of claim 19, wherein the signal strengths of access points from different areas within the subscriber's authorized use location is compared to historical data on signal strengths available around the subscriber's authorized use location.

* * * * *